United States Patent [19]

Masuda et al.

[11] Patent Number: 4,972,931
[45] Date of Patent: Nov. 27, 1990

[54] VISCOUS COUPLING

[75] Inventors: Katsuhiko Masuda; Masami Takano; Hiroyuki Makino, all of Tochigi, Japan

[73] Assignee: Honda Giken Kogyo Kabushiki Kaisha, Tokyo, Japan

[21] Appl. No.: 356,724

[22] Filed: May 25, 1989

[30] Foreign Application Priority Data

May 30, 1988 [JP] Japan .............................. 63-132413

[51] Int. Cl.⁵ .............................................. F16D 35/00
[52] U.S. Cl. .................. 192/58 B; 192/58 R
[58] Field of Search ............... 192/58 B, 58 R, 58 C, 192/112; 464/24

[56] References Cited

U.S. PATENT DOCUMENTS

| | | | |
|---|---|---|---|
| 4,022,084 | 5/1977 | Pagdin et al. | 74/711 |
| 4,031,780 | 6/1977 | Dolan et al. | 192/58 C X |
| 4,048,872 | 9/1977 | Webb | 464/24 X |
| 4,697,621 | 10/1987 | Diessner et al. | 192/58 R X |

FOREIGN PATENT DOCUMENTS

| | | | |
|---|---|---|---|
| 1357106 | 6/1974 | United Kingdom | 192/58 B |
| 2175056A | 11/1986 | United Kingdom | |
| 2199121 | 6/1988 | United Kingdom | 192/58 B |

Primary Examiner—Richard Lorence
Attorney, Agent, or Firm—Armstrong, Nikaido Marmelstein, Kubovcik & Murray

[57] ABSTRACT

A viscous coupling has a casing having a fluid chamber defined therein, and a plurality of first plates and a plurality of second plates, the first and second plates being rotatable about a common axis and disposed in the fluid chamber. The first and second plates drivingly interconnect the casing and at leest one rotatable member. A viscous fluid introduced into the fluid chamber through an inlet port defined in one end wall of the casing flows circumferentially in and along an annular groove defined in an inner surface of the end wall. Each of the first and second plates has a plurality of holes defined therein and spaced circumferentially thereof. The viscous fluid flows through these holes into spaces between adjacent ones of the first and second plates. The other end wall of the casing has an air vent hole defined therein which allows air to escape from the fluid chamber when the viscous fluid is charged into the fluid chamber.

3 Claims, 1 Drawing Sheet

VISCOUS COUPLING

BACKGROUND OF THE INVENTION

1. Field of the Invention

The present invention relates to a viscous coupling, and more particularly to a viscous coupling for connecting a vehicular drive shaft and a differential to each other and transmitting torque between a plurality of plates by utilizing shearing forces of a viscous fluid filled in the casing of the viscous coupling.

2. Description of the Relevant Art

One conventional viscous coupling has an enclosure comprising inner and outer cylindrical walls disposed concentrically with each other and rotatable relatively to each other, and end walls closing the opposite ends of the inner and outer cylindrical walls, as disclosed in U.S. Pat. No. 4,022,084, for example. The inner and outer cylindrical walls are drivingly coupled to respective two rotatable members of the differential. The enclosure is filled with a viscous fluid, and houses two sets of annular inner and outer interleaved plates alternately arranged at certain spaced intervals. The annular inner and outer plates are rotatable about a common axis, and are also movable axially to transmit torque therebetween through the utilization of shearing forces of the viscous fluid.

Each of the inner and outer plates has a plurality of holes defined therein for providing fluid communication between the spaces on the opposite sides of the plate. When the viscous fluid is introduced into the enclosure through an inlet in one end wall, the viscous fluid flows toward the other end wall through the holes in the inner and outer plates, but the viscous fluid flow has no directivity. The amount of the viscous fluid which flows through the holes in the plates is small, and most of the viscous fluid spreads radially outwardly from the inlet in the end wall and flows through a labyrinthine gap formed between the plates. It takes some time to supply the viscous fluid uniformly between the plates.

SUMMARY OF THE INVENTION

It is a primary object of the present invention to provide a viscous coupling which allows a fluid coupling to be introduced between a plurality of plates therein uniformly within a short period of time.

According to the present invention, a viscous coupling comprises a casing having a cylindrical wall and first and second end walls closing opposite open ends of the cylindrical wall, the casing defining a fluid chamber therein, a plurality of first plates and a plurality of second plates, the first and second plates being rotatable about a common axis and disposed in the fluid chamber, the first and second plates interconnecting the Casing and at least one rotatable member, and a viscous fluid filled in the fluid chamber for transmitting torque between the first and second plates due to shearing forces thereof. Each of the first and second plates has a plurality of holes defined therein and spaced circumferentially thereof. The first end wall has an inlet port for introducing the viscous fluid into the fluid chamber therethrough, and an annular groove defined in an inner surface thereof which faces the holes in one of the first plates that is positioned most Closely to the inlet port.

The viscous fluid introduced into the fluid chamber through the inlet hole flows in and along the annular groove in the first end wall. Then, the viscous fluid flows into the space between the first end wall and the first plate closest to the first end wall, and thereafter goes through the holes in the first plate into the space between the first plate and the adjacent second plate. Then, the viscous fluid flows through the holes in this second plate into the space between the second plate and the adjacent first plate. In this manner, the viscous fluid repeatedly flows into the successive spaces between the first and second plates toward the second end wall. The annular groove in the first end wall positively directs the viscous fluid circumferentially of the plates.

The second end wall of the casing has an air vent hole defined therein and an annular groove defined in an inner surface thereon which faces the holes in one of the second plates that is positioned most closely to the air vent hole. When the viscous fluid is charged into the fluid chamber, air flows circumferentially in and along the annular groove in the second end wall and is effectively removed from the fluid chamber from the air vent hole.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
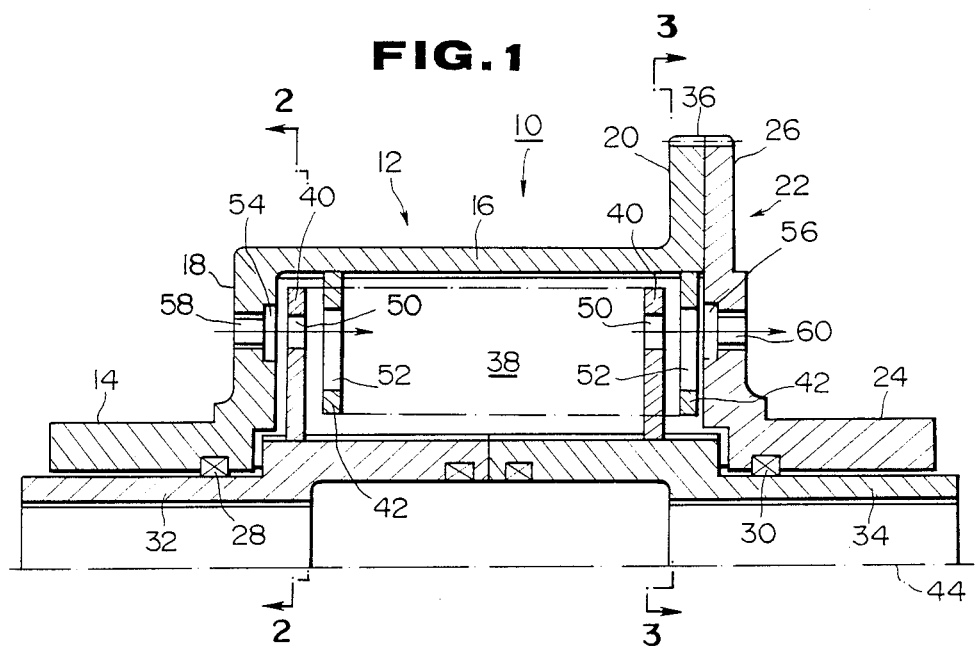
FIG. 1 is a fragmentary axial cross-sectional view of a viscous coupling according to the present invention.

As shown in FIG. 1, a viscous coupling 10 according to the present invention has a casing 12 comprising a smaller cylindrical portion 14, a larger cylindrical portion 16 joined axially to the smaller cylindrical portion 14 through an annular member 18 serving as a first axial end wall, and a flange 20 projecting radially outwardly from one end of the larger cylindrical portion 16 remote from the annular member 18. The casing 12 has an open end located radially inwardly of the flange 20 and closed by a cover 22 which includes a cylindrical portion 24 and an annular member 26 integral therewith and serving as a second axial end wall. The smaller cylindrical portion 14 of the casing 12 is rotatably mounted on an axle shaft 32 through a seal 28, and the cylindrical portion 24 of the cover 22 is rotatably mounted on an axle shaft 34 through a seal 30, the axle shafts 32, 34 being coaxial with each other and serving as parts of a differential (not shown). The rotational output or torque applied from a drive shaft (not shown) is applied to the viscous coupling 10 through a gear 36 on the radially outer peripheral surfaces of the flange 20 and the annular member 26.

The casing 12 defines a fluid chamber 38 therein which houses a plurality of first plates 40 and a plurality of second plates 42, the first and second plates 40, 42 being interleaved or alternately arranged with small gaps therebetween. The first and second plates 40, 42 are rotatable about a common axis 44. More specifically, the first plates 40 are splined to outer peripheral surfaces of larger-diameter portions of the axle shafts 32, 34 for axial movement therealong and keyed to the shafts 32, 34 for rotation therewith. Likewise, the annular second plates 42 are splined to an inner peripheral surface of the larger cylindrical portion 16 of the casing 12 for axial movement therealong and keyed to the casing 12 for rotation therewith.

Figure 2:
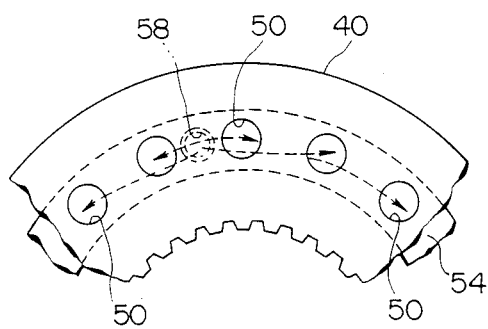
FIG. 2 is a cross-sectional view taken along line II—II of FIG. 1.
Figure 3:
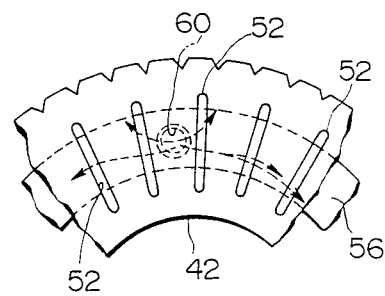
FIG. 3 is a cross-sectional view taken along line III—III of FIG. 1.

Each of the first plates 40 has a plurality of circular holes 50 (FIG. 2) defined therein and spaced circumferentially, and each of the second plates 42 has a plurality of radially elongate slots 52 (FIG. 3) defined therein and spaced circumferentially. The first end wall, i.e., the annular member 18 has an annular groove 54 defined in an inner surface thereof which faces the circular holes 50 in the leftmost one (as shown) of the first plates 40. Similarly, the second end wall, i.e., the annular member 26 has an annular groove 56 defined in an inner surface thereof which faces the slots 52 in the rightmost one (as shown) of the second plates 42. The annular groove 54 communicates with an inlet port 58 defined axially through the annular member 18, and the annular groove 56 communicates with an air vent port 60 defined axially through the annular member 26.

A viscous fluid introduced into the fluid chamber 38 through the inlet port 58 comprises a highly viscous fluid such as silicone oil. When the silicone oil is introduced into the fluid chamber 38, the viscous coupling 10 is vertically positioned with the inlet port 58 down and the air vent hole 60 up. The silicone oil which enters the fluid chamber 38 through the inlet port 58 first flows circumferentially in and along the annular groove 54. Then, the silicone oil flows into the circular holes 50 in the lowermost first plate 40 as indicated by the arrows in FIG. 2, and then into the space between the lowermost first plate 40 and the second plate 42 adjacent thereto. The silicone oil thereafter flows into the space between the adjacent second plate 42 and the next first plate 40 through the circumferentially spaced slots 52 defined in the second plate 42. In this manner, most of the introduced silicone oil spreads circumferentially over and between one pair of plates 40, 42, and then flows into the space between the adjacent pair of plates 40, 42. Therefore, the silicone oil is uniformly filled in the fluid chamber 38 within a reduced period of time. At the time the silicone oil is filled, air in the fluid chamber 38 flows in and along the annular groove 56 in the cover 22 and is effectively removed from the fluid chamber 38 through the air vent hole 60 as indicated by the arrow in FIG. 1.

When the silicone oil is charged into the viscous coupling, it also flows into the gaps between the outer peripheral edges of the first plates 40 and the inner peripheral surface of the larger cylindrical portion 16 of the casing 12, and also into the gaps between the inner peripheral edges of the second plates 42 and the outer peripheral surfaces of the larger-diameter portions of the axle shafts 32, 34. However, the amount of such silicone oil flowing into these gaps is much smaller than the amount of silicone oil flowing through the circular holes 50 in the first plates 40 and the slots 52 in the second plates 42. Most of the silicone oil is directed circumferentially by the annular groove 54 so as to flow through the circular holes 50 in the first plate 40 and the slots 52 in the second plates 42.

The inlet port 58 for introducing the viscous fluid and the air vent hole 60 for removing air may be switched around in position, i.e., the inlet port 58 may be defined in the annular member 26 and the air vent hole 60 may be defined in the annular member 18. The viscous coupling 10 may be used to interconnect an input shaft and an output shaft, rather than the two axles shafts 32, 34 which are output shafts.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

I claim:

1. A viscous coupling comprising;

a casing having a cylindrical wall and first and second end walls closing opposite open ends of said cylindrical wall, said casing defining a fluid chamber therein;

a plurality of first plates and a plurality of second plates, said first and second plates being rotatable about a common axis and disposed in said fluid chamber, said first and second plates interconnecting said casing and at least one rotatable member; and a viscous liquid filled in said fluid chamber for transmitting torque between said first and second plates due to shearing forces thereof;

each of said first and second plates having a plurality of holes defined therein and spaced circumferentially thereof;

said first end wall having an inlet port for introducing the viscous fluid into said fluid chamber therethrough, and a first annular groove defined in an inner surface of said first end wall concentric with said axis, said first annular groove being in fluid communication with said inlet port and facing said holes in one of said first and second plates that is positioned most closely to said inlet port said inlet port being disposed at a radial distance from said axis between the radially inner and outer edge of said first annular groove.

2. A viscous coupling according to claim 1, wherein said second end wall has an air vent hole defined therein for removing air from said fluid chamber, and a second annular groove defined in an annular surface of said second end wall, said second annular groove being in communication with said air vent hole and facing said holes in one of said first and second plates that is positioned most closely to said air vent hole.

3. A viscous coupling according to claim 1, wherein said first and second plates are alternately arranged axially.

* * * * *